(No Model.)

W. YERDON.
HOSE COUPLING BAND.

No. 428,660. Patented May 27, 1890.

WITNESSES:

INVENTOR
William Yerdon.
BY
Wm H Babcock
ATTORNEY

UNITED STATES PATENT OFFICE.

WILLIAM YERDON, OF FORT PLAIN, NEW YORK.

HOSE-COUPLING BAND.

SPECIFICATION forming part of Letters Patent No. 428,660, dated May 27, 1890.

Application filed March 24, 1890. Serial No. 345,159. (No model.)

*To all whom it may concern:*

Be it known that I, WILLIAM YERDON, a citizen of the United States, residing at Fort Plain, in the county of Montgomery and State of New York, have invented certain new and useful Improvements in Hose-Coupling Bands; and I do hereby declare the following to be a full, clear, and exact description of the invention, such as will enable others skilled in the art to which it appertains to make and use the same.

The chief object of this invention is to provide a hose-coupling band which will prevent the buckling up of the material of the hose between the lugs through which the bolt passes, the opening at that point being guarded by a single broad and strong tongue attached to one end of said band and fitting into a corresponding recess in the inner face of the other end. An attempt has heretofore been made to protect this opening by the use of narrow tongues extending from the ends in opposite directions and overlapping; but these are necessarily weak and likely to bend or break under strain, besides pinching the material.

Figure 1:
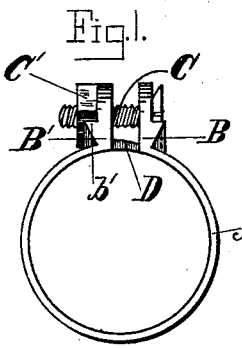
Figure 2:
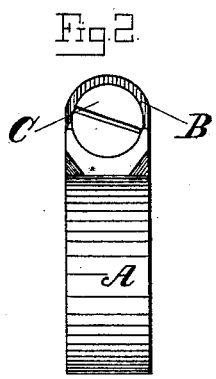
Figure 3:
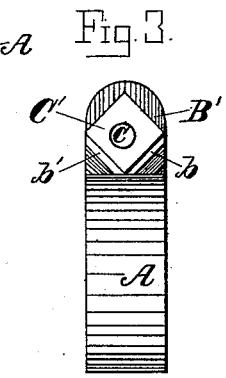
Figure 4:
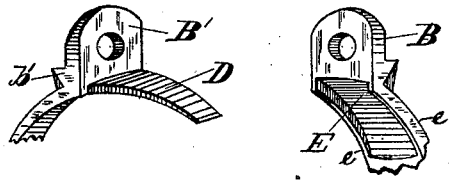
Figure 5:
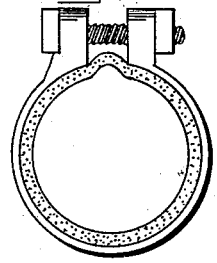

In the accompanying drawings, Figure 1 represents an end elevation of a clamp embodying my invention. Fig. 2 represents a side elevation of the same. Fig. 3 represents a similar view taken from the opposite side. Fig. 4 represents in detail the ends of the band slightly separated to show the broad tongue and the broad groove or recess; and Fig. 5 represents an old form of hose-coupling band applied to a hose, illustrating its defect.

A designates the band, which is shown smooth, but, if preferred, may be ribbed for greater strength. As usual, this band has an opening at the top, where lugs B B' are raised upon it for the bolt C to pass through. This bolt is provided with a nut C', bearing against the outer face of lug B' to clamp the coupling-band on the hose by drawing said lugs together. The outer face of lug B' has two inclined shoulders $b\ b'$, which together take the shape of a broad V and fit upon one of the corners of the nut, so as to lock it; or there may be a single broad shoulder with a V-shaped recess therein. The end of the band which carries this lug B' is also provided with a broad tongue D, extending across the opening between said lugs B and B' and into a groove or recess E in the inner face of the opposite end of said band. This recess occupies nearly the entire width of said band, leaving only a small rib $e$ at each edge thereof. The said tongue fills the said groove nearly from one of the said ribs to the other. Its inner face is flush with said ribs, and it is curved to conform to the shape of the hose. The tip of said tongue is rounded, and the tongue is also thinned from the base to the tip, the said recess or groove shelving correspondingly. The faces which come in contact have corresponding curvature.

A coupling-band thus constructed will fit snugly on the hose without pinching, rumpling, or breaking it, and will withstand uninjured any strain to which it is likely to be subjected. The tongue-and-groove joint is nearly or quite as strong as any other part.

Having thus described my invention, what I claim as new, and desire to secure by Letters Patent, is—

A hose-coupling consisting of a band having lugs and clamping devices, and also provided at one end with a tongue D and at the other end with a groove E and ribs $e$, said tongue fitting into said groove between said ribs, substantially as set forth.

In testimony whereof I affix my signature in presence of two witnesses.

WILLIAM YERDON.

Witnesses:
 ALBERT SITTERLY,
 HARRY TATLOCK.